June 27, 1967 HANS-HOLGER WIESE 3,327,359
FASTENER FOR STEEL-WIRE REINFORCED ELASTIC BELTS
Filed Sept. 23, 1964
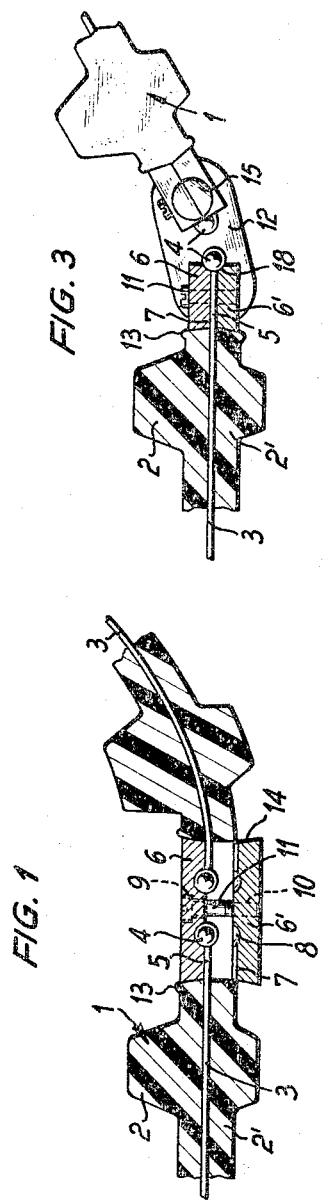
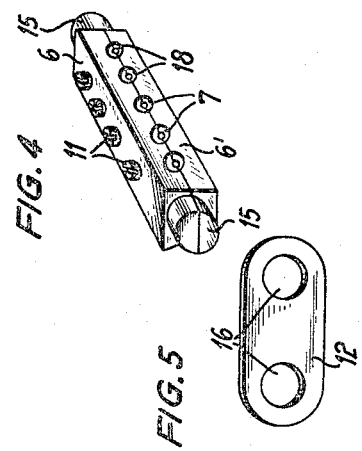
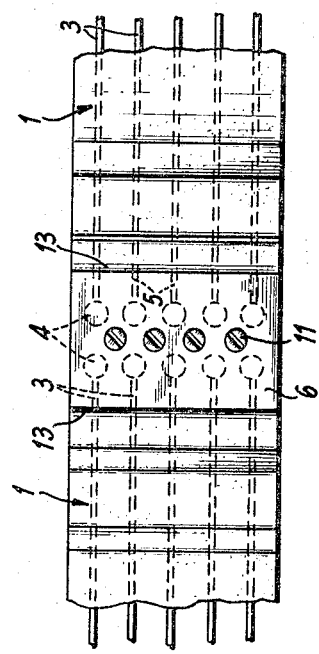
INVENTOR
Hans-Holger Wiese
BY
Richards & Geier
ATTORNEYS United States Patent Office 3,327,359
Patented June 27, 1967

3,327,359
FASTENER FOR STEEL-WIRE REINFORCED
ELASTIC BELTS
Hans-Holger Wiese, 197 Fuhrberg, Germany
Filed Sept. 23, 1964, Ser. No. 398,801
Claims priority, application Germany, Sept. 24, 1963,
W 35,303
2 Claims. (Cl. 24—37)

This invention relates to elastic belts, especially to fasteners for steel-wire reinforced elastic belts used with heavier machinery.

In the construction of linking locks it has hitherto been known to fit steel balls at both ends of a belt to the free ends of the steel wires and then to connect both ends with linking locks, the clamping bars of which fit over the steel balls. In these constructions the short pieces of the free running steel wires between the balls and their emergence from the normal belt are weak points, since they break soon under the high bending stresses exerted during the runs of the belt around wheels.

To avoid the high bending stress for the free parts of the steel wires it had been suggested to connect additional horizontal supports to the clamping bars of the lock. These supports reduce the bending ability of the lock.

The present invention has for its object the provision of improvements in the construction of such fasteners, especially to avoid the breaking of the steel wires at the point where they emerge from the steel balls.

A further object of the invention is to avoid the breaking of the steel wires by exerting a prestress to the steel wires along that part which emerges from the belt and runs to the steel balls.

A still further object is to combine the prestressing action with the fastening of the clamping bars in that the clamping bars are longer than the free ends of said steel wires, emerging from the belt. Due to this arrangement the elastic material of the belt is compressed and gathered tightly near the clamping bars and thereby exerts the prestress to the free ends of the steel wires.

In a preferred embodiment of the invention the clamping bars exert the prestress by having their sides extending across the belt with a surface inclined inwardly to the belt, said inclined surface compressing the elastic material of the belt while fastening the clamping bars.

In another embodiment of the invention, adapted for smaller bending curvatures the clamping bar is split into two separate locks, one for each belt end, which are connected with fish-plates, guided on pivots of the clamping bars. The fish-plate and pivot arrangement then produces the bending upon smaller wheels and prevents the lock-section from higher bending stresses.

A further object is a fastener, which is made dust-tight by that part of the elastic material of the belt which is gathered tightly along the clamping bars.

The invention is not limited to the use with elastic belts or toothed belts but also can be used with fasteners for conveyors or driving belts.

Other objects, features and advantages of the present invention will be readily apparent from the following detailed description of certain preferred embodiments thereof taken in conjunction with the accompanying drawings, in which:

FIGURE 1 is a longitudinal sectional view of a fastener for toothed belts, embodying features of the invention.

FIGURE 2 is a top plan view of the fastener of FIGURE 1.

FIGURE 3 is a longitudinal sectional view of another junction with two separate locks.

FIGURE 4 is a perspective view of a single fastener of the embodiment of FIGURE 3.

FIGURE 5 is a perspective view of a linking element used with the fastener according to FIGURES 3 and 4.

In FIGURE 1 a toothed belt 1 is shown, which carries teeth 2, 2' on either side. For example, teeth 2 are connected with driving or reverse toothed wheels, while toothed blocks 2' are carrying the cross bars of a rod conveyor belt, the lateral sides of which have two toothed belts. Toothed belt 1 is reinforced with imbedded steel wires 3, which form an inside layer of tensile strength and do not affect its elasticity within the required limits. At the junction of the toothed belts the ends 5 of the steel wires 3 are left free for a suitable length by cutting away parts of the elastic material of the belt. Steel balls 4 are fixed in known manner at the ends of wires 3. A pair of clamping bars 6, 6', which is held together by screws 11, has curved grooves 8 which surround the steel balls 4'. Both ends of toothed belt 1 are connected to the bars. The free ends of wires 5 fit in corresponding longitudinal grooves 7 of the two clamping bars.

In FIGURE 1 the upper clamping bar 6 is shown in its fastened position, when both clamping bars 6 and 6' are screwed together, whereas the lower clamping bar 6' is shown in the position before screwing together the clamping bars. The rectangular clamping bars 6, 6' are longer in the longitudinal direction of the toothed belt than the length of the free ends 5 of the steel wires 3, which is also the distance of the steel balls 4 from the edge of the cut part of the toothed belt. The upper clamping bar 6 comprises holes 9 for screws, whereas the lower clamping bar 6' has threaded holes 10. Screws 11 serve for screwing together the clamping bars. When screwing together both clamping bars the grooves 8, which serve for taking up the steel balls 4, act with respect to them like a wedge connection. The steel balls 4 are pulled into the grooves and the transverse edges 14 of the clamping bars push back the elastic material of the end of the toothed belt so that a bulge 13 is formed and the material is put under prestress. Due to this prestress the junction is closed without joints and the two ends of the steel wires 3 are fixed by this prestress in such a manner in the longitudinal grooves 7 that no deflections occur at the junction of the ends 5 of the wires with the steel balls 4, even if the toothed belt is bent under a small radius of curvation. The transverse edges 14 of the clamping bars are inclined toward the middle of the belt, in order to facilitate the backward push of the elastic material of the two ends of the belt when screwing together the clamping bars 6.

It is advisable to provide a groove around the emerging point of the free ends of the wire in the front edge of the belt.

In FIGURES 3 to 5 another embodiment of a linking lock is shown. Steel wires 3 are imbedded in such a manner in the toothed belt 1 provided with teeth 2, 2' that they are in the neutral bending zone of the toothed belt. The steel wires 3 are open at the ends of the toothed belt and reinforced at their outer ends with steel balls 4, which fit in a row across the belt.

The free ends 5 of the wires are stretched between clamping bars 6 of the linking lock. For this purpose clamping bars 6, 6' are provided with longitudinal grooves 7 for taking up the ends 5 of the wires and with curved recesses 18 for supporting the steel balls 4 at their inner surfaces facing the end of the belt (FIGURE 4). The clamping bar 6 comprises screw holes 9 and the clamping bar 6' has threaded holes 10, in which screws 11 can be fixed, which are holding together both clamping bars, so that the ends 5 of the wires are stretched in the grooves 7 and the steel balls 4 press against curved recesses 18 of the clamping bars. Due to the greater length of grooves 7 the ends 5 of the steel wires cannot move at their junction with the steel balls 4 and are not exposed to any bending.

A plate 12, shaped like a chain link (FIGURE 5) serves to flexibly link both tension locks. Plates 12 have holes 16 receiving the lathed ends 15 of the clamping bars and are secured in this position by spring rings, pegs and the like.

The length of the connecting plates corresponds to the toothing of belt 1.

Due to the prestress in the tightly fitting junction of the embodiment according to FIGURES 3 to 5, the ends of the wires 5 in the clamping bars 6 are fixed in such a way that they are not exposed to any bending stress, since the junction is provided by the plates 12 acting like links of a chain across driving or reversing wheels of small diameter.

If rubber is inserted into the clamping bars before they are screwed together, the junction can be vulcanised after the tightening of the linking lock. In this case it is advisable to vulcanise the steel balls 4 as well.

It will be understood that modifications and variations may be effected without departing from the scope of the novel concepts of the present invention.

I claim:

1. A fastener for joining two ends of an elastic belt containing metal wires embedded within the belt, said wires having end portions extending beyond the ends of the belt and metal balls carried by said wire end portions, said fastener comprising at least one upper bar and at least one lower bar, and screws connecting said upper bar with said lower bar, said upper bar having longitudinal grooves and recesses located upon a lower surface of the upper bar and said lower bar having corresponding longitudinal grooves and recesses located upon the upper surface of the lower bar facing said lower surface, said wire end portions being longitudinally strecthed and located in the longitudinal grooves of said upper and lower bars, the balls carried by said longitudinally stretched wire end portions being located in and pressing against said recesses, said bars having sloping edges pressed against the ends of the elastic belt by the longitudinally stretched wires, whereby bulges are formed in said ends.

2. A fastener in accordance with claim 1, having one said upper bar and one said lower bar attached to one of the said two ends of the said belt and another said upper bar and another said lower bar attached to the other of the said two ends of the said belt, the first mentioned upper and lower bars having projecting round side portions, and the second-mentioned upper and lower bars having projecting round side portions, and plates located on opposite sides of said bars and having holes receiving said round side portions.

References Cited

UNITED STATES PATENTS

| 1,706,354 | 3/1929 | Geist | 24—31 |
| 2,265,604 | 12/1941 | Knoedler | 24—31 |
| 2,675,592 | 4/1954 | Lofton | 24—33 |
| 3,105,390 | 10/1963 | Funke et al. | 24—31 X |

FOREIGN PATENTS 163,925    9/1949    Austria.

WILLIAM FELDMAN, *Primary Examiner.*

M. S. MEHR, *Assistant Examiner.*